March 27, 1928.

J. O. BOVING 1,664,347

APPARATUS FOR RAREFYING GASES

Filed Feb. 10, 1926     2 Sheets-Sheet 1

March 27, 1928.

J. O. BOVING

APPARATUS FOR RAREFYING GASES

Filed Feb. 10, 1926

Patented Mar. 27, 1928.

1,664,347

UNITED STATES PATENT OFFICE.

JENS ORTEN BOVING, OF WESTMINSTER, LONDON, ENGLAND.

APPARATUS FOR RAREFYING GASES.

Application filed February 10, 1926, Serial No. 87,369, and in Great Britain February 27, 1925.

This invention relates to hydraulic apparatus, working on the siphon principle, for rarefying gases.

According to the invention the apparatus comprises a chamber for connection to a vacuum pan or other receptacle containing the air or other gas to be rarefied, two downwardly extending conduits entering the said chamber and constituting with the latter a siphon serving by the descent of liquid in one of the said conduits (herein termed the discharge conduit) to draw liquid up the other conduit (herein termed the supply conduit) into the said chamber, and an induction head at the upper end of the discharge conduit, this induction head having holes or pipes communicating with the interior of the said chamber so that during the siphoning action air or gas from the said chamber (and therefore from the vacuum pan or other receptacle connected thereto) is entrained in the liquid entering the discharge conduit, the remaining air or gas being thus rarefied and being maintained in this condition so long as the apparatus is working.

In one form of the invention for use when there is available a body of water, such as a river, one portion of which (termed the high level water) is at a higer level than the rest (termed the low level water), the lower end of the aforesaid supply conduit dips into the high level water and the lower end of the discharge conduit dips into the low level water. The difference in level between the high level water and the low level water thus serves to provide for the siphoning action of the apparatus and for the consequent rarefication of the air or gas as aforesaid, which continues so long as the water flows through the apparatus.

In another form of the invention for use under conditions where the natural operating head provided by the high and low level water referred to above is not available, the aforesaid discharge conduit discharges into an open tank and the lower end of the supply conduit communicates with the liquid in this tank, and in this case, as there is no natural operating head of water, a lifting pump of the required capacity is provided to pump liquid from the tank into the supply conduit, this pump taking the place of the said natural operating head. The apparatus in this form is self-contained as the same volume of liquid is in constant circulation and consequently any liquid suitable for the particular gas to be rarefied can be used.

The discharge conduit may be in the form of a pipe arranged centrally within an outer pipe (or a casing) of larger diameter than the former pipe, the annular space between the two pipes constituting the supply conduit. The induction head is preferably made to float on the liquid within the aforesaid chamber and the upper part of the discharge pipe is made telescopic and connected to the induction head; in this manner the induction head and the contiguous part of the discharge pipe through which the liquid enters are maintained at a fixed position in relation to the level of the liquid in the chamber so as to obtain maximum efficiency.

The wall between the aforesaid conduits may be provided with charging ports which can be opened or closed at will in order to enable the siphoning action to be started without its being necessary to employ external means for creating a vacuum in the aforesaid chamber.

In order that the said invention may be clearly understood and readily carried into effect, the same will now be described more fully with reference to the accompanying drawings, in which:—

Figure 1:
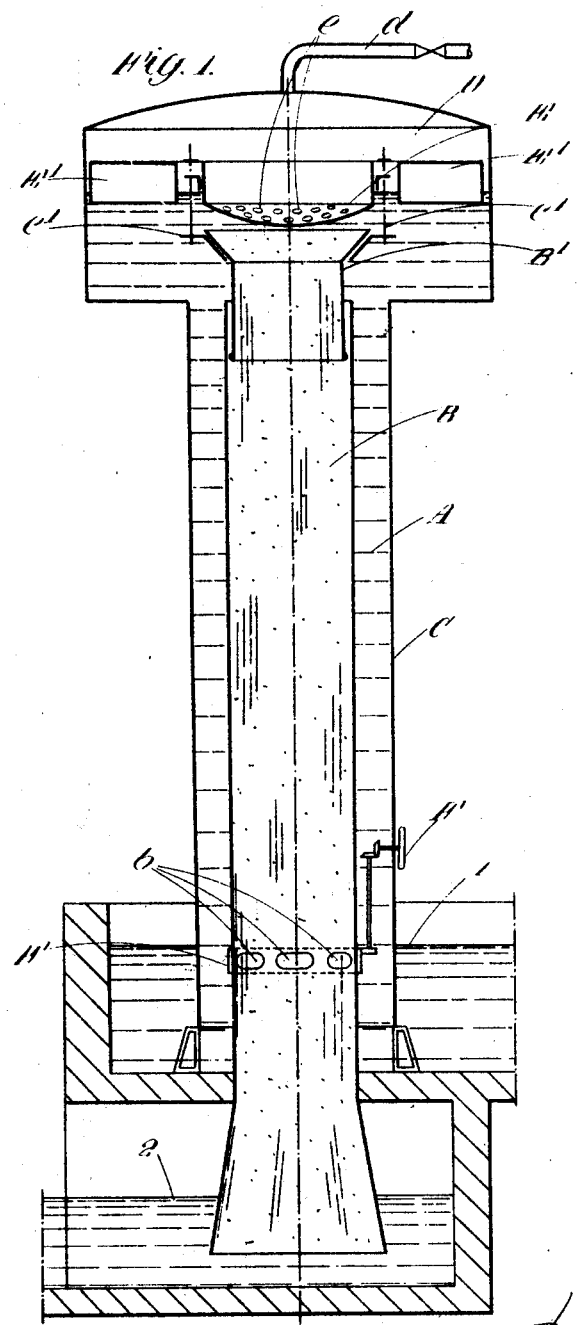
Figure 1 is a sectional view shewing a constructional form of the invention.
Figure 2:
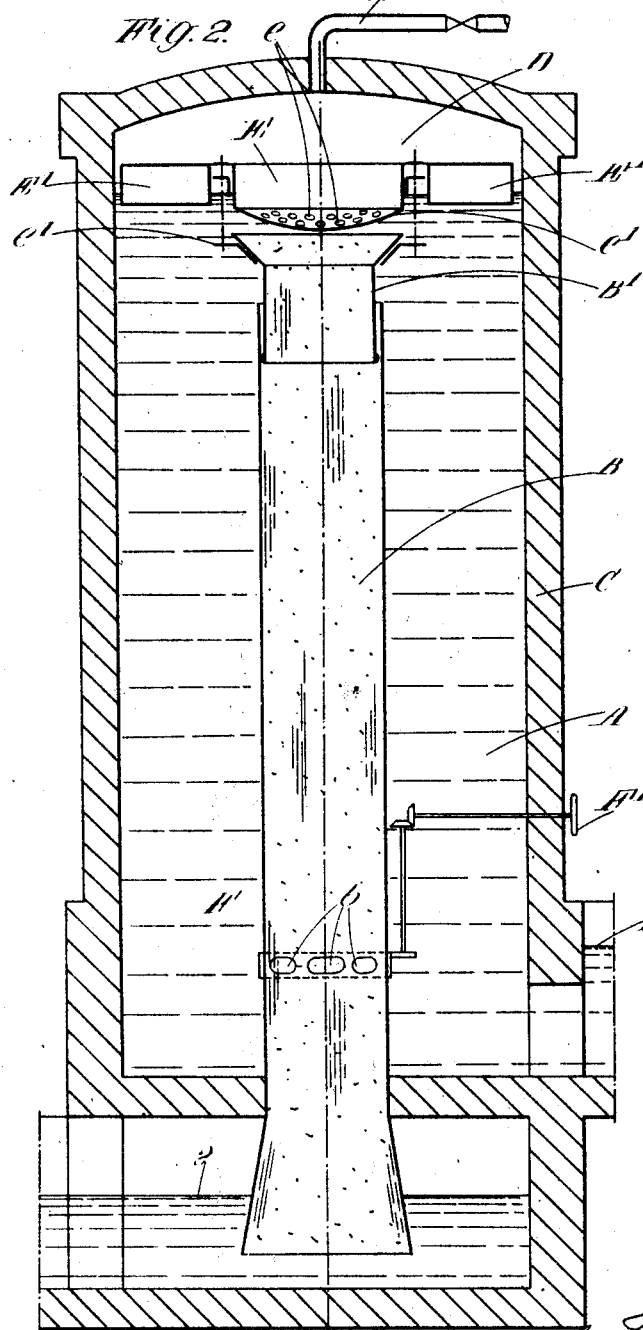
Figure 2 is a view similar to Figure 1 of a slightly modified form.

A is the supply conduit and B is the discharge conduit. In Figures 1, 2 and 4 the latter conduit is constituted by a pipe arranged centrally within another pipe C (Figures 1 and 4) or within a concrete or other built-up casing C (Figure 2), the annular space between the parts B and C constituting the supply conduit A. D is the chamber with which the conduits A and B communicate at their upper ends, this chamber having a pipe $d$ connected to a vacuum pan or other receptacle containing the air or other gas to be rarefied, and E is the induction head carried by a float E' and provided with air holes $e, e$ ... (or alternately air pipes) which communicate with the interior of the chamber D. The head E is connected to the upper part B' of the discharge conduit B, which upper part can slide with respect to the main part as shewn. By reason of this arrangement the head E and the part B' always occupy the same position relatively to the level of the liquid in the chamber D notwithstanding any rise and fall of the level of this liquid which may occur during working. The connection between the head E and the part B' is preferably effected by adjustable screws $e'$, $e'$ so that the distance between the lower part of the head E and the flared opening at the top of the part B' can be altered to vary the amount of liquid flowing into the discharge conduit B.

Referring to Figure 1, the lower end of the supply conduit A dips into a body of water 1 (termed the high level water) and the lower end of the discharge conduit B dips into a body of water 2 (termed the low level water) arranged at a suitable level below the high level water 1. F is an adjustable sleeve which surrounds the discharge conduit B and which can be displaced by a handwheel F' on the outside of the pipe C so as to open or close at will charging ports $b$, $b$ . . . in the wall of this conduit. In starting the working of the apparatus, the sleeve F is moved to open the ports $b$, $b$ . . ., thereby establishing communication between the conduits A and B and therefore between the high level water 1 and the low level water 2. The water from the high level rushes through the ports $b$, $b$ . . . into the lower part of the discharge conduit B and in so doing entrains a certain amount of air from the upper part of the conduit B and the chamber D thereby creating a small and steadily increasing vacuum. This causes the water level to rise in both the conduit B and the conduit A and for an apparatus designed to give a moderate degree of vacuum in the chamber D the water level will eventually rise up to the desired height in the chamber D above the flared opening of the upper part B' of the conduit B whereupon the sleeve F is moved to close the ports $b$, $b$ . . . and the siphoning action is thus established, air being then sucked through the holes (or pipes) $e$, $e$ . . . of the induction head from the chamber D and from the vacuum pan or other receptacle connected thereto by the pipe $d$ this air passing with the water down the discharge conduit B and escaping to the atmosphere at the low level. For an apparatus designed to give a greater degree of vacuum there may be two or more sets of the aforesaid ports at different levels each provided with sleeves similar to the sleeve F and in this case the opening of the lower set of ports brings the water level up to the next highest set of ports; the latter set of ports are then opened and the lower set of ports closed, this action being repeated in respect of the other sets of ports (when these are provided) until the water level reaches the desired height in the chamber D as aforesaid.

The construction shewn by Figure 2 is in principle the same as that shewn by Figure 1 but the pipe C of Figure 1 is replaced by a concrete or other built-up casing and the chamber D is constituted by the upper end of this casing instead of as in Figure 1 by a part of larger diameter than the outer pipe C.

What I claim and desire to secure by Letters Patent of the United States is:—

1. Hydraulic apparatus, working on the siphon principle, for rarefying gases, comprising a chamber for connection to a receptacle containing the air or gas to be rarefied, two downwardly extending conduits entering the said chamber and constituting with the latter a siphon serving by the descent of liquid in one of said conduits to draw liquid up the other conduit into said chamber, an induction head arranged at the upper end of the former conduit and provided with conduits communicating with the interior of said chamber, and means for opening and closing at will ports in the wall between said conduits so as to start the apparatus working without the necessity of creating a vacuum by external means.

2. Hydraulic apparatus, working on the siphon principle, for rarefying gases and for use when there is available a body of water, such as a river, one portion of which is at a higher level than the rest, comprising a chamber for connection to a receptacle containing the air or gas to be rarefied, two downwardly extending conduits entering the said chamber one of these conduits dipping into the high level water and the other conduit discharging into the low level water so that these conduits and the said chamber constitute a siphon, an induction head arranged at the upper end of the latter conduit and provided with conduits communicating with the interior of said chamber, and means for opening and closing at will ports in the wall between said conduits so as to start the apparatus working without the necessity of creating a vacuum by external means.

3. Hydraulic apparatus, working on the siphon principle, for rarefying gases, comprising a chamber for connection to a receptacle containing the air or gas to be rarefied, two downwardly extending and coaxially arranged conduits entering the said chamber and constituting with the latter a siphon serving by the descent of liquid in one of said conduits to draw liquid up the other conduit into said chamber, an induction head arranged at the upper end of the former conduit and provided with conduits communicating with the interior of said chamber, and means for openng and closing at will ports in the wall between said conduits so as to start the apparatus working without the necessity of creating a vacuum by external means.

4. Hydraulic apparatus, working on the siphon principle, for rarefying gases and for use when there is available a body of water, such as a river, one portion of which is at a higher level than the rest, comprising a chamber for connection to a receptacle containing the air or gas to be rarefied, two downwardly extending and co-axially arranged conduits entering the said chamber one of these conduits dipping into the high level water and the other conduit discharging into the low level water so that these conduits and the said chamber constitute a siphon, an induction head arranged at the upper end of the latter conduit and provided with conduits communicating with the interior of said chamber and means for opening and closing at will ports in the wall between said conduits so as to start the apparatus working without the necessity of creating a vacuum by external means.

JENS ORTEN BOVING.